United States Patent

Robbins

[11] 4,051,344

[45] Sept. 27, 1977

[54] REMOTE CONTROL FOR AN ARC WELDING MACHINE

[76] Inventor: Dennis R. Robbins, 20134 2nd South, Seattle, Wash. 98148

[21] Appl. No.: 572,381

[22] Filed: Apr. 28, 1975

[51] Int. Cl.² .................................................. B23K 9/10
[52] U.S. Cl. ...................................... 219/132; 219/130
[58] Field of Search ................... 219/132, 130, 136; 338/178, 179

[56] References Cited

U.S. PATENT DOCUMENTS

| | | | |
|---|---|---|---|
| 2,311,883 | 2/1943 | Smoot | 338/178 |
| 2,383,725 | 8/1945 | Landis et al. | 219/132 |
| 2,907,945 | 10/1959 | Brennen et al. | 219/136 |
| 3,389,365 | 6/1968 | Matthews et al. | 338/179 |
| 3,521,023 | 7/1970 | Dahlman et al. | 219/130 |
| 3,633,146 | 1/1972 | Sasaki et al. | 338/179 |
| 3,968,341 | 7/1976 | Manning | 219/132 |

*Primary Examiner*—J. V. Truhe
*Assistant Examiner*—Clifford C. Shaw
*Attorney, Agent, or Firm*—Graybeal, Barnard & Uhlir

[57] ABSTRACT

The control unit comprises an elongated body having a forward torch mounting portion. Rearwards of the torch the body houses a linear potentiometer which includes an upstanding control arm for its movable contact. An off-on switch is located within said body, in a position to be contacted and operated by the control arm. A thumb button controlled sliding control member is attached to the control arm. In use, the user grips the mid portion of the body and places his thumb on the thumb button. He uses a simple linear movement of his thumb to both control the linear potentiometer, for varying the welding current, and to operate the off-on switch, for turning the arc welding machine on and off.

4 Claims, 6 Drawing Figures

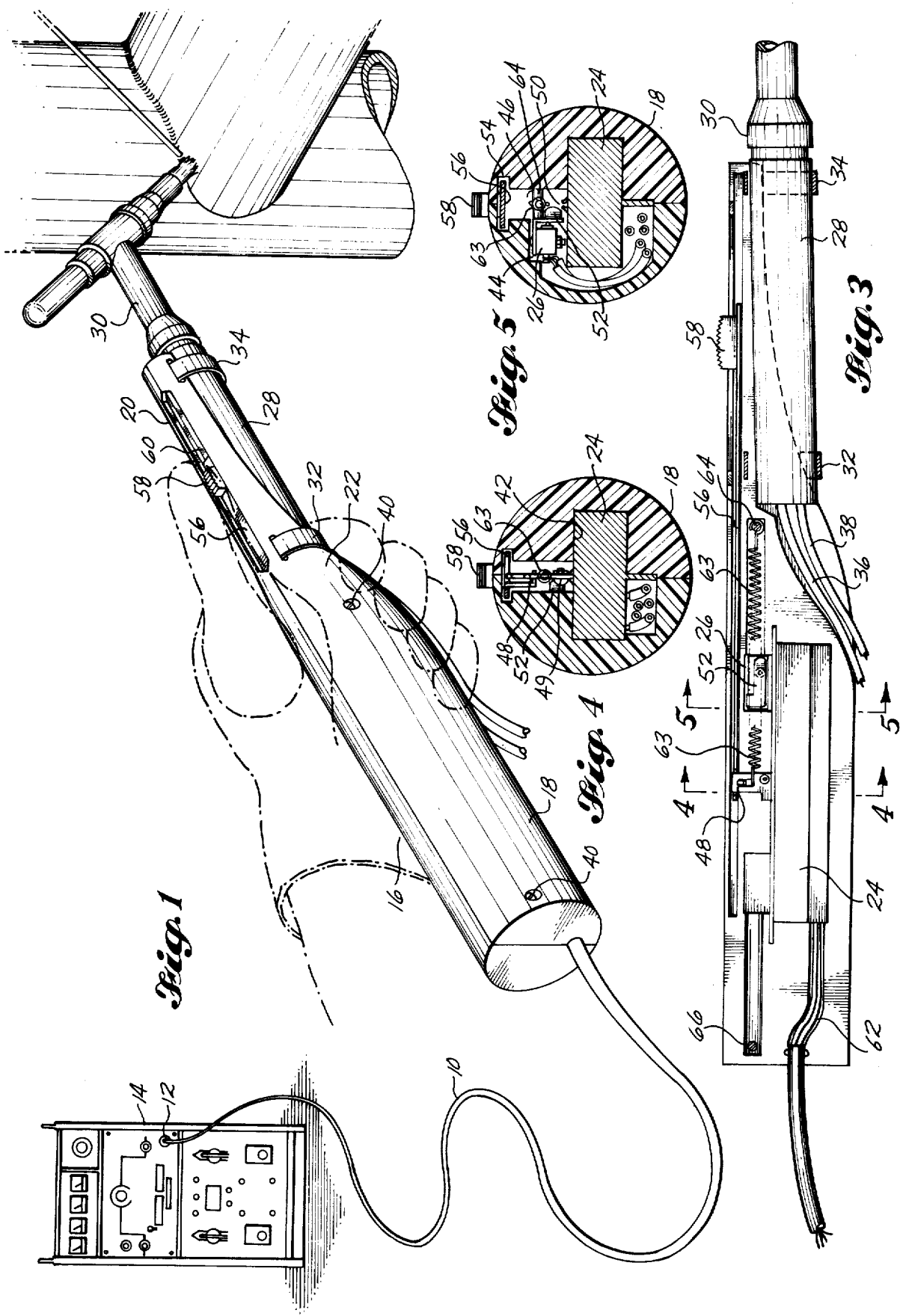

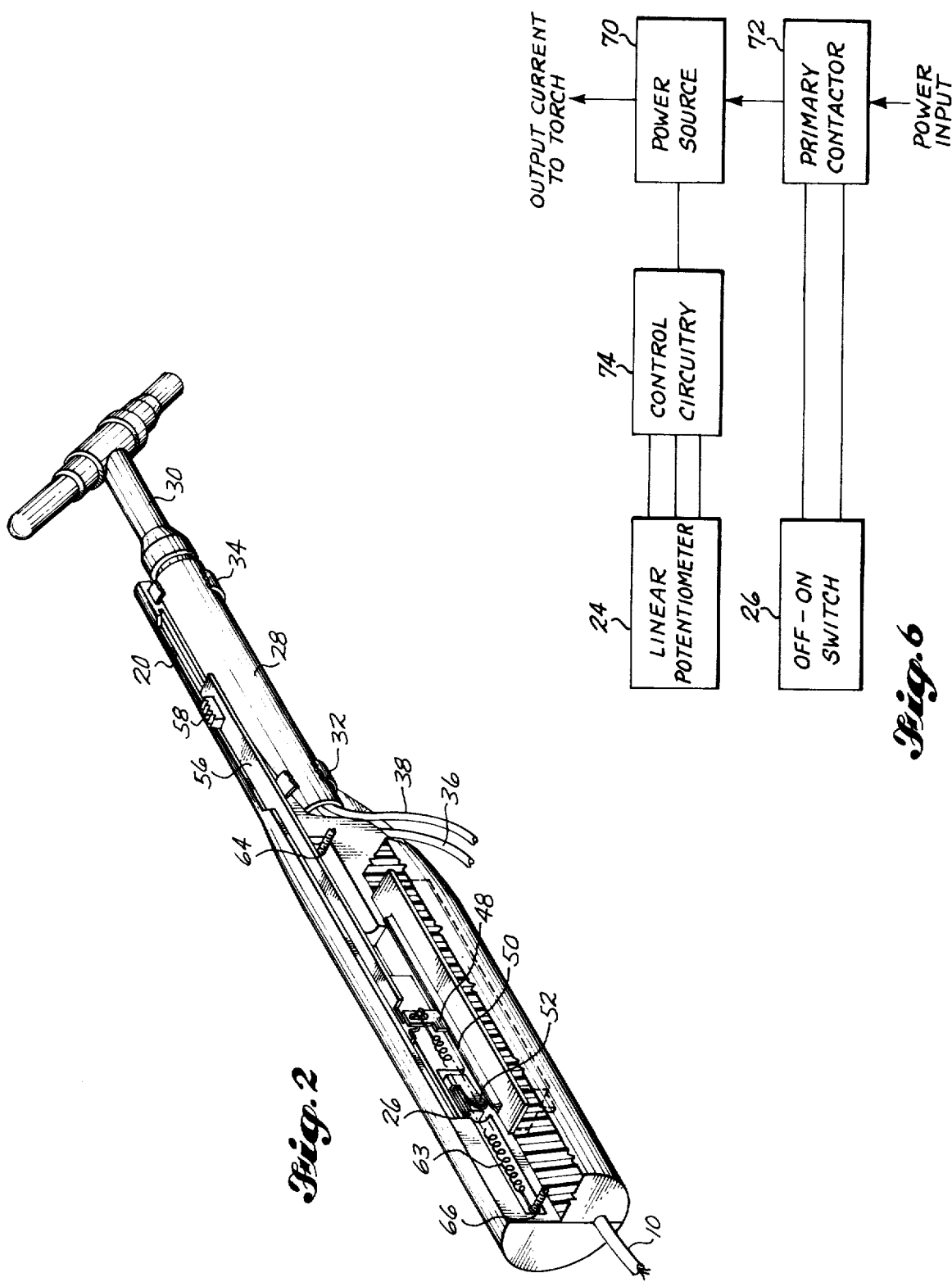

REMOTE CONTROL FOR AN ARC WELDING MACHINE

BACKGROUND OF THE INVENTION

1. Field of the Invention

The present invention relates to the field of electric welding, and more particularly to the provision of an improved remote control system for the arc welding machine, characterized by a single control lever for both turning the generator on and off and varying the current output, by a simple linear movement of the thumb of the welder's torch holding hand.

2. Description of the Prior Art

Others have recognized the desirability of having control means for a welding current generator located at the torch itself, so that the welder does not have to go back to the current generator console each time that he wishes to change the current output. Examples of remote control systems having some type of control button or switch at the welding torch are shown by the following U.S. Pat. Nos. 2,425,183, granted Aug. 5, 1947; 2,484,421, granted Oct. 11, 1949; 2,658,132, granted Nov. 3, 1953; 2,686,239, granted Aug. 10, 1954; 2,964,681, granted Dec. 13, 1960; 3,041,526, granted June 26, 1962; 3,402,341, granted Sept. 17, 1968 and 3,811,085, granted May 14, 1974.

Also, Miller Electric Manufacturing Co. of Appleton, Wisconsin, discloses a fingertip remote amperage control which attaches to the handle of a TIG welding torch. This attachement is shown on page 1 of Miller Catalog AFL-6-72, under FTC-3-100 (Stock No. 040 276). This unit includes a rotary knob positioned to be operated by the thumb of the welder's torch holding hand.

SUMMARY OF THE INVENTION

The remote control unit of the present invention is characterized by a single sliding control member which adjusts both the current output of the arc welding machine and turns it off and on. According to the invention, the remote control is an attachment to the welding torch in the form of an elongated body which includes a sliding control member having a thumb engaging member in position to receive the user's thumb when the torch and attachement are in the user's hand. The body carries a linear potentiometer which is a part of an electrical control circuit for the welding current power source, serving to increase and decrease the current output. The body also carries an off-on switch which is part of a separate electrical control for the primary connector for turning the welding current off and on.

In operation, the user turns the current on by sliding the control member away from an end position, much in the same manner that a conventional flashlight is turned on. The output current is then increased by sliding the control member an additional amount in the same direction, and is decreased by sliding the control member back in the opposite direction.

According to an aspect of the invention, the movable contact of the linear potentiometer includes a control arm arranged to travel a linear path. The sliding control member is attached to such control arm and moves it along its linear path as the sliding control member is itself moved by the use's thumb. The off-on switch includes a movable contact member positioned to be contacted and actuated by an actuating means on the control arm.

Other more specific features of the invention are hereinafter discussed in some detail as a part of the detailed description of the illustrated embodiment.

BRIEF DESCRIPTION OF THE DRAWING

FIG. 1 is a pictorial view of an embodiment of the remote control attachment of this invention, showing the attachment connected to a welding torch and the assembly in the user's hand, being used at a location remote from the current generator;

FIG. 2 is a pictorial view of the torch and attachment, with a portion of the attachment cut away for clarity of illustration of its internal parts;

FIG. 3 is a longitudinal section view of the attachment, taken at the division between the two halves of the attachment's body, and showing a portion of the torch attached;

FIG. 4 is a cross sectional view taken substantially along line 4—4 of FIG. 3;

FIG. 5 is a second cross sectional view, taken substantially along line 5—5 of FIG. 3; and FIG. 6 is a block diagram of the control circuit.

DESCRIPTION OF THE PREFERRED EMBODIMENT

Referring to FIG. 1, a control circuit cord 10 extends from a plug in connection 12 in the front wall of a console 14 of an arc welding machine to the attachment 16. Attachment 16 comprises a body having a forward torch mounting portion 20, a hand grip central portion 22, and a rearward portion which houses a current varying potentiometer 24 and an off-on switch 26.

As shown by FIGS. 1 - 3, the handle 28 of the welding torch 30 is located below the mounting portion 20 of housing 18 and is firmly secured to housing 18, such as by the user of a pair of strap like fasteners 32, 34, for example. The conductors 36, 38 for the torch extend from the torch back to the console in the usual manner.

The housing or body 18 may be longitudinally split into two parts which are joined together by screws 40. A first inner space or cavity 42 may be formed in the rear portion of housing 18, one-half in each part thereof (FIGS. 4 and 5), of a size to snugly receive the linear potentiometer 24. A second inner space or cavity 44 may be formed in one-half of the body 18, for housing the off-on switch 26. A third inner space or cavity 46 is formed laterally outwardly from a slotted side of the potentiometer 24 includes an upstanding control arm 48 which extends through the slot 50 (FIGS. 2 and 5) into the inner space 46. Switch 26 includes a movable contact 52 which also projects into the inner space 46 for engagement with actuating means 49 mounted on control arm 48.

Housing 18 is formed to include a longitudinal slideway 54 which is positioned laterally outwardly of inner space 46. Slideway 54 receives an elongated sliding control member 56 which is attached at its rear end to the potentiometer control arm 48. A thumb button 58 is provided at the front end of control member 56. Thumb button 58 travels in an elongated slot 60 formed in the forward upper portion of the body 18. Mating grooves 62 are formed in the two halves of the housing 18 for receiving the conductors within control cord 10, leading from both off-on switch 26 and potentiometer 24 back to the console 14.

If desired, a spring 63 (FIG. 3) may be mounted between the potentiometer control arm 48 and an anchor pin 64 to bias the control arm to an end position. It is contemplated that if the user's thumb were either accidentally or consciously released from the thumb button 58 the spring 64 would urge the control arm 48 into engagement with the movable contact 52 of the off-on switch 26 thereby immediately turning off the current output of the welding current power source. Another anchor pin 66 (FIG. 2) is provided so that the spring 63 may be mounted to bias the control member 46 in a rearward direction. An additional second inner space or cavity 68 is provided to allow the off-on switch 26 to be mounted so that its movable contact 52 will be engaged by the control arm 48 when biased to the rearward end position.

By way of typical and therefore non-limitative example, the torch 30 may be of the general type disclosed by U.S. Pat. No. 3,703,622, granted Nov. 21, 1972, to Arthur L. Kleppen, Jr. Also by way of typical and therefore non-limitative example, the arc welding machine may be like the one which is manufactured by Hobart Brothers Company, Troy, Ohio 45373, and shown in such company's technical manual No. TM 208, relating to the 300 AMP AC/DC TIG Welder, dated Dec. 1, 1970. The illustrated embodiment is adapted to plug in to the control plug outlet 12 for the foot pedal type remote control unit which is furnished by Hobart as a part of the power source.

Other typical and therefore non-limitative example of an arc welder machine which could be used in conjunction with the instant hand held remote control unit would be TIG Welder Model No. 901 718 maufactured by the Miller Electric Manufacturing Company or the Ideal Arc TIG Machine manufactured by the Lincoln Manufacturing Co.

The nominal resistance of linear potentiometer 24 will be selected to correspond with a particular welding machine and the extent of variation desired within a given range. However, it is generally anticipated that a linear potentiometer of a maximum nominal resistance of either 1K$\Omega$, 10K$\Omega$, 25K$\Omega$ or 50K$\Omega$ will provide a sufficient degree of variation when used in conjunction with the power sources of the aforementioned arc welding machines.

Linear potentiometer 24 and off-on switch 26 are shown in block diagram form in FIG. 6 respectively attached to conventional components of an overall arch welding machine. The control circuitry 74 employs a low voltage circuit in conjunction with linear potentiometer 24 to vary the output current of the welding current power source 70. The primary contactor 72 which connects the power source 70 to a convention source of electrical power.

A safety feature most often employed in arc welding machines, as shown in FIG. 6, is a primary contactor 72 activated through a low voltage circuit by off-on switch 26. The primary contactor 72 functions as a remotely controlled relay to connect a power source 70 for welding current with a convention supply of electric power. When used in conjunction with one of the aforementioned commercially available units, an off-on switch of the normally closed type is selected such that the power source 70 will not be connected to the conventional supply of electric power if the movable contact 52 of switch 26 is engaged by the actuating means 49 mounted on the sliding post 48 of the linear potentiometer 24.

A particularly novel feature of this invention resides in the construction of the attachment body to accommodate the off-on switch 26 and linear potentiometer 24 such that the user can select a rearward or forward sliding action of the control member 56 to turn on and increase the current output of the arc welding machine. This change can be accomplished by merely disassembling the housing 18 by removal of screws 40 thereby allowing access to the inner space 46. The off-on switch 26 is then moved from its rearward housing (FIG. 2) to the forward housing (FIG. 3) and the linear potentiometer 24 is turned end for end in its inner space 42. If a spring member 63 is used to bias the power source to its off position, it is necessary to disconnect the fixed end from its anchor pin 66 (FIG. 2) and remount it on anchor pin 64 (FIG. 3), thus biasing the sliding post 68 of the linear potentiometer 24 in the opposite direction.

Those skilled in the art of arc welding know it is desirable for a welding operator to adjust the output of the welding current power source as the operating conditions demand. Initially, it is often necessary that the operator be at a distance far removed from the location of the arc welding machine. At this remote location a welding operator must initially turn on ant then adjust the amperage output of the power source as conditions warrant. Additionally, while there are automatic devices for feeding the welding rod to the work, most often the operator must feed the welding rod with one hand while holding torch with his other hand.

When the arc is struck, the operator determines from observation and experience if further adjustment of the current output is necessary to provide the proper heat. The initial "puddle" is started at a low current and the current is increased to bring the "puddle " to the proper size.

As the "puddle" is moved along the joint to be welded, the operator may desire to change the welding current to increase or decrease puddle size depending on the width to be filled by the bead, variations in welded material, etc. Upon completion of the weld the "puddle" must be "tailed out" by continually decreasing the puddle size thereby blending the bead into the surrounding material. During this procedure the rate of decreasing amperage in welding current is a significant factor in properly "tailing out" the "puddle".

In the same manner, maintaining "puddle" size when welding circular pipe often requires adjustment of the welding current. For example, when welding circular pipes extending horizontally, a constant welding current would not maintain the same size "puddle" on both the lower and upper portions of the pipe due to thermal build-up. Consequently, to move at a constant rate around the pipe, an operator must decrease the welding current to maintain a "puddle" size as the bead is moved from the upper portion of the pipe to the lower portion of the pipe and increase the welding current as the bead is moved up the opposite side.

Another circumstance under which it is usually necessary to vary the amperage of the welding current is when welding light gauge sheet metal. If the welding current is too high, the sheet metal will warp badly or even burn through unless "puddle" size can be quicly adjusted.

The invention may be embodied in other specific forms without departing from the spirit or character thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. Remote-control mechanism for an electric welding torch, comprising:
    an axially elongated body including a forward torch mounting portion and a handle forming portion, sized to be held in a user's hand, said body being longitudinally split into two parts which together define an inner cavity;
    a linear potentiometer within said inner cavity, said linear potentiometer including an elongated housing including opposite side parts and a top wall which includes a longitudinal slot, and a sliding control member for said linear potentiometer movable between longitudinal end positions, including a control arm which projects outwardly through said slot;
    said body parts including side recess means which are sized to snugly receive and hold said opposite side portions of said potentiometer housing when the two body parts are assembled about said potentiometer; and are positioned to orient the slot in the top wall of the potentiometer housing and the longitudinal path of travel of the control arm generally within the separation plane of the body parts;
    said body parts including means defining an elongated slot generally at the separation plane of the body parts and forwardly of the location of the linear potentiometer;
    a sliding external control member mounted on said body for movement longitudinally of said slot;
    an elongated internal control link interconnected between said external control member and the control arm of the linear potentiometer, for moving the linear potentiometer between its longitudinal end portions in response to the external control member being moved between its end positions by the user's hand; and
    an off-on switch carried within said body at one end of the path of travel of the control arm, said switch including a movable contact, and said control arm carrying an actuating means positioned to contact and move said movable contact, to actuate the switch when the control arm is at said one end of its path of travel.

2. Remote-control mechanism according to claim 1, wherein said off-on switch is mounted within said inner cavity, laterally adjacent the longitudinal path of travel of said control arm, and wherein said actuating means on said control arm comprises a laterally extending projection facing said off-on switch, and wherein said movable contact member of said off-on switch is engageable with said laterally extending projection on said control arm when said sliding control member is in its end position adjacent said off-on switch.

3. Remote-control mechanism according to claim 1, wherein said internal control link is a structurally stiff member and it serves as the support for said external control member, and wherein said external control member is mounted onto its end of said internal control link, to be carried thereby.

4. Remote-control mechanism according to claim 3, wherein said off-on switch is mounted within said inner cavity, laterally adjacent the longitudinal path of travel of said control arm, and wherein said actuating means on said control arm comprises a laterally extending projection facing said off-on switch, and wherein said movable contact member of said off-on switch is engageable with said laterally extending projection on said control arm when said sliding control member is in its end position adjacent said off-on switch.

* * * * *